J. B. STEARNS,
Assignor to THE WESTERN UNION TELEGRAPH COMPANY.
DUPLEX TELEGRAPH APPARATUS.
No. 10,033. Reissued Feb. 7, 1882.
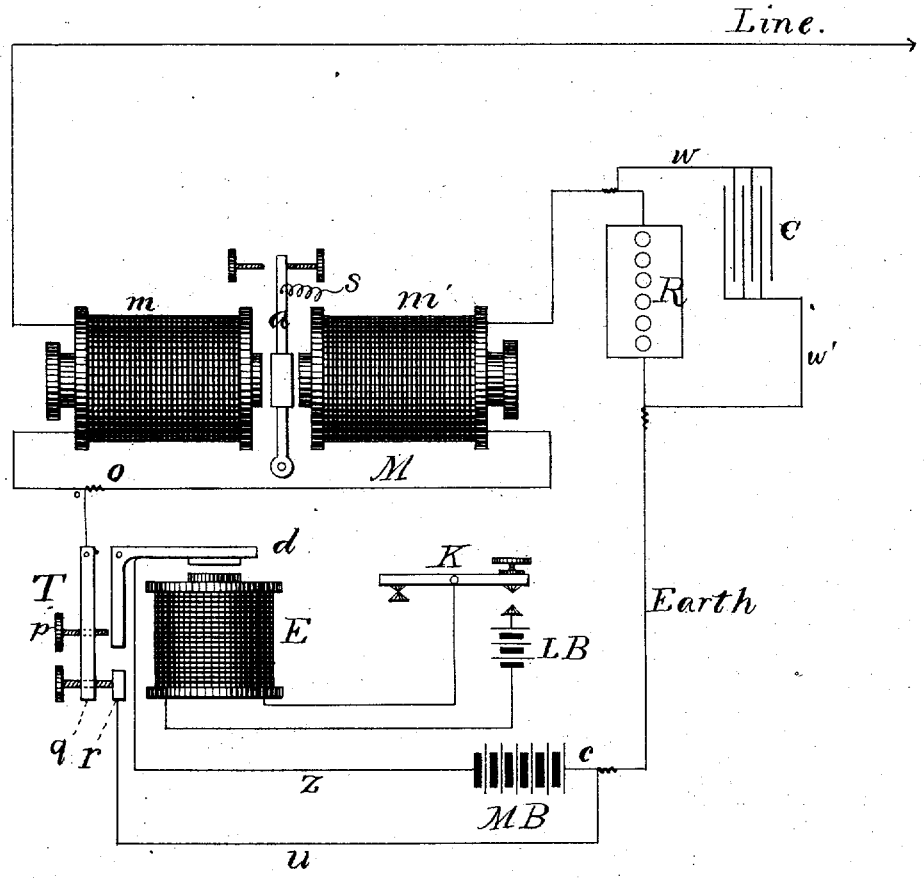
Witnesses:
John C. Sanders
Wm. Arnoux
Inventor:
Joseph B. Stearns
by his Attorney,
C. L. Buckingham
N. PETERS, Photo-Lithographer, Washington, D. C.

UNITED STATES PATENT OFFICE.

JOSEPH B. STEARNS, OF BOSTON, MASSACHUSETTS, ASSIGNOR TO THE WESTERN UNION TELEGRAPH COMPANY, OF NEW YORK, N. Y.

DUPLEX-TELEGRAPH APPARATUS.

SPECIFICATION forming part of Reissued Letters Patent No. 10,033, dated February 7, 1882.

Original No. 126,847, dated May 14, 1872. Reissue No. 5,344, dated April 1, 1873. Application for reissue filed November 23, 1881.

*To all whom it may concern:*

Be it known that I, JOSEPH B. STEARNS, a citizen of the United States, formerly of Boston, in the county of Suffolk and State of Massachusetts, and now temporarily residing in London, in the United Kingdom of Great Britain and Ireland, have invented certain new and useful Improvements in Duplex Telegraphs, of which the following is a specification.

My invention relates to an improvement in the art, method, or system of transmitting two telegraphic signals simultaneously from opposite ends of one and the same line-wire.

The general object of the invention is to prevent the false signal which has heretofore been produced upon the receiving-instrument at the transmitting or home station by the return-current or electrical discharge, commonly called the "static discharge," which discharge is the sudden escape to earth of electricity accumulated in the line by induction during the transmission of a signal.

The invention comprises a novel art, method, or system of compensating the return or static discharge from a telegraph-line, which consists in the simultaneous production at the home station of an artificial static discharge capable of exerting an effect substantially equal but opposite to that of the main line, upon the receiving-instrument at that station.

For the purpose of more clearly explaining my invention, I will first describe the construction and mode of operation of one form of telegraphic apparatus for the simultaneous transmission of signals in opposite directions over the same line, commonly known as a "duplex telegraph," selecting for that purpose the apparatus described in my former patent of June 2, 1868, numbered 78,548. This apparatus is represented, in connection with my present improvements, in the accompanying drawing.

The conditions requisite for the duplex transmission of signals in opposite directions are, first, the receiving-instrument at each station must remain at all times in connection with the line; second, the signals transmitted by the key at either end of the line must produce no effect upon its associate receiving-instrument at the same station; and, third, the resistance of the line must remain practically constant, irrespective of the position of the transmitting-keys. These several conditions are fulfilled in the apparatus represented in the accompanying drawing, and hereinbefore referred to, as will appear from the following description.

The drawing represents the apparatus at one terminal station of the line, that at the other station being similar thereto in construction and operation.

The receiving-instrument M (here shown as a Morse relay) is constructed in the ordinary manner, and consists of an electro-magnet, *m*, an armature, *a*, and a retracting-spring, *s*, to which is added for duplex working an equating electro-magnet, *m'*, so placed as to be capable of exerting an attraction equal to that of the electro-magnet *m* upon the same armature *a*, but in a contrary direction. Such an arrangement is technically termed a "differential electro-magnet." One terminal of the main battery M B is connected with the earth, and the other to the lever *d* of the transmitter T, which acts as a key to transmit signals over the main line, as hereinafter explained. When the transmitter is closed the lever *d* is brought against the stop *p*, making contact with it and lifting it from the stop *r*, whereupon the current from the battery M B passes by the wire *z* through the contact-lever *p* to the point *o*, where it divides, one portion passing through the electro-magnet *m* of the receiving-instrument to the line, while the other portion passes through the electro-magnet *m'* of the receiving-instrument and returns directly to the earth, or, what amounts to the same thing, to the other pole, *c*, of the main battery. This latter branch of the circuit, from the point *o* to the point *c*, is technically termed the "artificial line," in order to distinguish it from the main line, which extends from the point *o* to the distant station. By inserting a rheostat, R, which has approximately the same resistance as the main line, into the artificial line, as shown in the drawing, the electric current going out from the transmitter will divide at *o* into two equal portions; and as these produce an equal development of magnetism in the two electro-magnets *m* and *m'*, the latter will counteract each other in their effect upon the armature *a*, which will therefore remain at rest, notwithstanding that a current is passing over the line to the distant station. If, however, the distant station transmits a current at the same time, the strength of current in the main line is doubled by the combined action of both terminal batteries, and the electro-magnet *m* overpowers the equating-magnet *m'*, draws the armature *a* away from it, and produces a signal at the home station. Thus it will be understood that the receiving-instrument at the home station responds only when currents or signals are transmitted from the distant station, and not to those proceeding from its associate key at the home station. Consequently the two stations can transmit signals simultaneously, and the instrument at each station, though always traversed by the current of the main line, responds only to the signals which are transmitted from the other station.

In operating this apparatus it is preferable to make use of a transmitter actuated by an electro-magnet, which is in turn excited by a current from a local battery controlled by an ordinary Morse finger-key, as shown in the drawing, where K is the key; L B, the local battery; E, the electro-magnet which actuates the transmitter-lever *d*, and *r* is a contact-stop connected to the earth by a wire, *u*. When the key and transmitter are open the line is connected directly to the earth through the wire *u*.

Having thus described one form of the apparatus to which it may be applied, I will now describe the nature of my improvement and the mode of its application.

It is well known that an insulated telegraphic line-wire of considerable length, whether suspended above the earth or submerged in water, is capable of accumulating or storing up a quantity of electricity while connected with a battery. This property of an insulated conductor is termed its "inductive" or "electro-static" capacity, and the electricity so retained is called the "static charge" of the conductor. If, therefore, a long line of telegraph, arranged in the manner hereinbefore described, be connected with the battery, by depressing the key at the sending-station, as for the purpose of transmitting a signal, the line will acquire a considerable static charge. At the termination of the signal when the key is raised the line is disconnected from the battery and connected to the earth at the home station, whereupon the accumulated electricity stored up in the line will suddenly escape to the earth, traversing the electro-magnet *m* of the receiving-instrument, and producing what is termed the "static discharge." As the rheostat R and the short line in which it is placed have a very small electro-static capacity, there will be very little discharge from the artificial line through the equating-magnet *m'*, and consequently a false signal of momentary duration will be produced by the uncompensated action of the main-line discharge in the electro-magnet *m*.

I have discovered that by producing an artificial discharge of electricity at the home station, and causing the same to occur simultaneously with the discharge from the line, the effect of the latter upon the home instrument can be practically eliminated, provided proper precaution is taken that the artificial discharge shall occur at the same time, and shall be of substantially equal intensity, but contrary in its effect to that of the main line. This result is effected by making use of a device for accumulating or storing up electricity, which is termed a "condenser," the construction and mode of operation of which are well known, and need not therefore be particularly described. I have shown such a condenser in the drawing at C. It consists of two sets of metallic plates separated by insulating-spaces, the alternate plates being connected with each other so as to form two distinct groups. The terminal of one group of plates is connected by a wire, *w*, to the artificial line at a point between the electro-magnet *m'* and the rheostat R, while the terminal of the other set of plates is connected to the earth by the wire *w'*. Thus it will be understood that when a signal is transmitted by depressing the key K the condenser C acquires a static charge at the same time that the main line does, and when the key is raised the condenser discharges through the electro-magnet *m'* at the same instant that the main line discharges through the electro-magnet *m*, whereby the effect which the latter tends to exert upon the armature *a* is exactly compensated, and no false signal can be produced.

I do not limit myself to the use of a condenser with the particular form of duplex apparatus shown, as the hereinbefore-described method may be employed with equally good results in connection with other forms of apparatus.

I claim as my invention—

The method of preventing the return-current or static discharge from a telegraph-line from producing false signals upon the receiving-instrument at the home station in the process of transmitting signals therefrom, which consists in the simultaneous production at the home station of an artificial static discharge capable of exerting an effect substantially equal but opposite to that of the main line upon the receiving-instrument at the home station.

Signed by me this 4th day of August, A. D. 1881.

J. B. STEARNS.

Witnesses:
CHAS. T. CARRET,
HENRY BALDWIN, Jr.